(12) United States Patent
Raskar

(10) Patent No.: US 7,229,023 B2
(45) Date of Patent: Jun. 12, 2007

(54) RADIO AND OPTICAL IDENTIFICATION TAGS

(75) Inventor: Ramesh Raskar, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 10/643,614

(22) Filed: Aug. 19, 2003

(65) Prior Publication Data
US 2005/0040241 A1 Feb. 24, 2005

(51) Int. Cl.
*G06K 19/06* (2006.01)
*G06K 7/08* (2006.01)

(52) U.S. Cl. .................. 235/492; 235/385; 235/451; 340/10.4

(58) Field of Classification Search ........... 235/383, 235/385, 451, 492; 705/20, 28; 340/10.4, 340/10.41, 825.25; 250/566, 214 RC; 700/225; 398/135
See application file for complete search history.

(56) References Cited

U.S. PATENT DOCUMENTS

| | | | | |
|---|---|---|---|---|
| 5,134,277 A | * | 7/1992 | Yerbury et al. | 250/214 RC |
| 5,301,353 A | * | 4/1994 | Borras et al. | 455/9 |
| 5,465,082 A | * | 11/1995 | Chaco | 340/825.49 |
| 5,635,701 A | * | 6/1997 | Gloton | 235/486 |
| 5,774,876 A | * | 6/1998 | Woolley et al. | 705/28 |
| 5,825,045 A | * | 10/1998 | Koenck et al. | 250/566 |
| 5,874,724 A | * | 2/1999 | Cato | 235/492 |
| 5,929,770 A | * | 7/1999 | Faita | 340/10.41 |
| 5,954,148 A | * | 9/1999 | Okumura et al. | 180/9.21 |
| 6,036,348 A | * | 3/2000 | Miura | 700/225 |
| 6,269,342 B1 | * | 7/2001 | Brick et al. | 705/20 |
| 6,300,880 B1 | * | 10/2001 | Sitnik | 340/825.25 |
| 6,782,208 B1 | * | 8/2004 | Lundholm et al. | 398/135 |
| 6,784,788 B2 | * | 8/2004 | Beigel et al. | 340/10.4 |
| 7,007,219 B2 | * | 2/2006 | Haulk et al. | 714/749 |
| 7,012,534 B2 | * | 3/2006 | Chaco | 340/573.1 |
| 2001/0054005 A1 | * | 12/2001 | Hook et al. | 705/20 |

* cited by examiner

*Primary Examiner*—Jared J. Fureman
(74) *Attorney, Agent, or Firm*—Dirk Brinkman; Clifton D. Mueller; Gene V. Vinokur

(57) ABSTRACT

An identification tag is formed with a single microcircuit. The microcircuit includes an optical transceiver, a radio transceiver, both connected to a memory storing an identification code. At least one of the transceivers operates in receive mode, and at least one of the transceivers operates in transmit mode. The identification code is transmitted by the transceiver operating in the transmit mode in response to receiving a predetermined signal by the transceiver operating in the receive mode.

19 Claims, 2 Drawing Sheets

RADIO AND OPTICAL IDENTIFICATION TAGS

FIELD OF THE INVENTION

This invention relates generally to identification tags, and more particularly to tags that can be selectively operated.

BACKGROUND OF THE INVENTION

Conventional radio-frequency identification (RFID) tags are used to identify objects, including people. RFID tags provide an alternative to bar codes for distinguishing and recording product for purchase. RFID tags can result in labor savings to manufacturers, distributors, and retailers. Annual estimated saving for a larger retailer using RFID tags could amount to billions of dollars.

The typical prior art RFID includes a microchip and an antenna. The antenna can be in the form of a tuned induction coil. The operation is fundamentally simple. Typically, the microchip stores a unique identification code that can be detected when the antenna of the tag couples inductively with an antenna of the reader. This coupling changes the impedance, hence the load at the receiving antenna. The load can be modulated according to the stored identification code, by switching the coil in and out.

Conventional RFID tags can be characterized according to the following basic attributes. An active RFID tag includes a power source to operate the microchip and to 'broadcast' the signal to the reader. Semi-passive tags use a battery to operate the microchip, but use an induced current to operate the transmitter. Because these types of tags are more costly to manufacture, they are typically used for high-cost objects that need to be identified at greater distances. For a passive tag, the reader induces a current in the tag by emitting electromagnetic radiation. These tags are relatively cheap, and are effective up to ranges of about 50 meters, depending on the power of the transmitted RF signal.

The tag can be read-only, or read-and-write. In the later type, information can be added to the tag over time using, e.g., an electrically erasable programmable read-only memory (EEPROM). For example, the tag can store when it was read, or how often it was read.

RFID tags can also be distinguished according to the frequency at which they operate. The operating frequencies need to consider RF spectrum assignments made by regulatory agencies such as the FCC in the United States. Low frequency tags are generally cheaper to make than high frequency devices, and use less power. Different applications may also prefer different frequencies. For example, low frequency tags are more suitable for applications with a high fluid content, e.g., items under water, humans, fruits, water based products. High frequency tags provide a higher data rate and range. Also, because high frequencies tend to be line-of-sight, they can be useful at fixed location with a narrow field-of-view, for example, assembly lines and doorways.

One problem encountered with RFID tags is collision.

Reader collision can happen when one reader interferes with the signal of another nearby reader. This can be a problem in warehousing where multiple users may want to identify stock at the same time. This can result in multiple readings of the same tag, which need to be resolved. In the prior art, time division multiplexing has been used to overcome this problem. However, this increases the complexity and cost of the system.

Tag collision occurs when many tags are co-located. This can result in multiple simultaneous readings of different tags, which need to be resolved. A number of techniques have been proposed to mitigate such collisions. Most of these require complex protocols that slow down the process.

Therefore, there is a need for RFID tags that can be selectively operated.

SUMMARY OF THE INVENTION

An identification tag is formed with a single microcircuit. The microcircuit includes an optical transceiver in the form of a single photodiode or phototransistor. The diode can transmit and sense light depending on the direction current is driven through the diode.

The circuit also includes a radio transceiver. In its simplest form the transceiver is an induction coil. Both transceivers are connected to a memory storing an identification code.

At least one of the transceivers operates in receive mode, and at least one of the transceivers operates in transmit mode. The identification code is transmitted by the transceiver operating in the transmit mode in response to receiving a predetermined signal by the transceiver operating in the receive mode.

DETAILED DESCRIPTION OF THE PREFERRED EMBODIMENT

Figure 1:
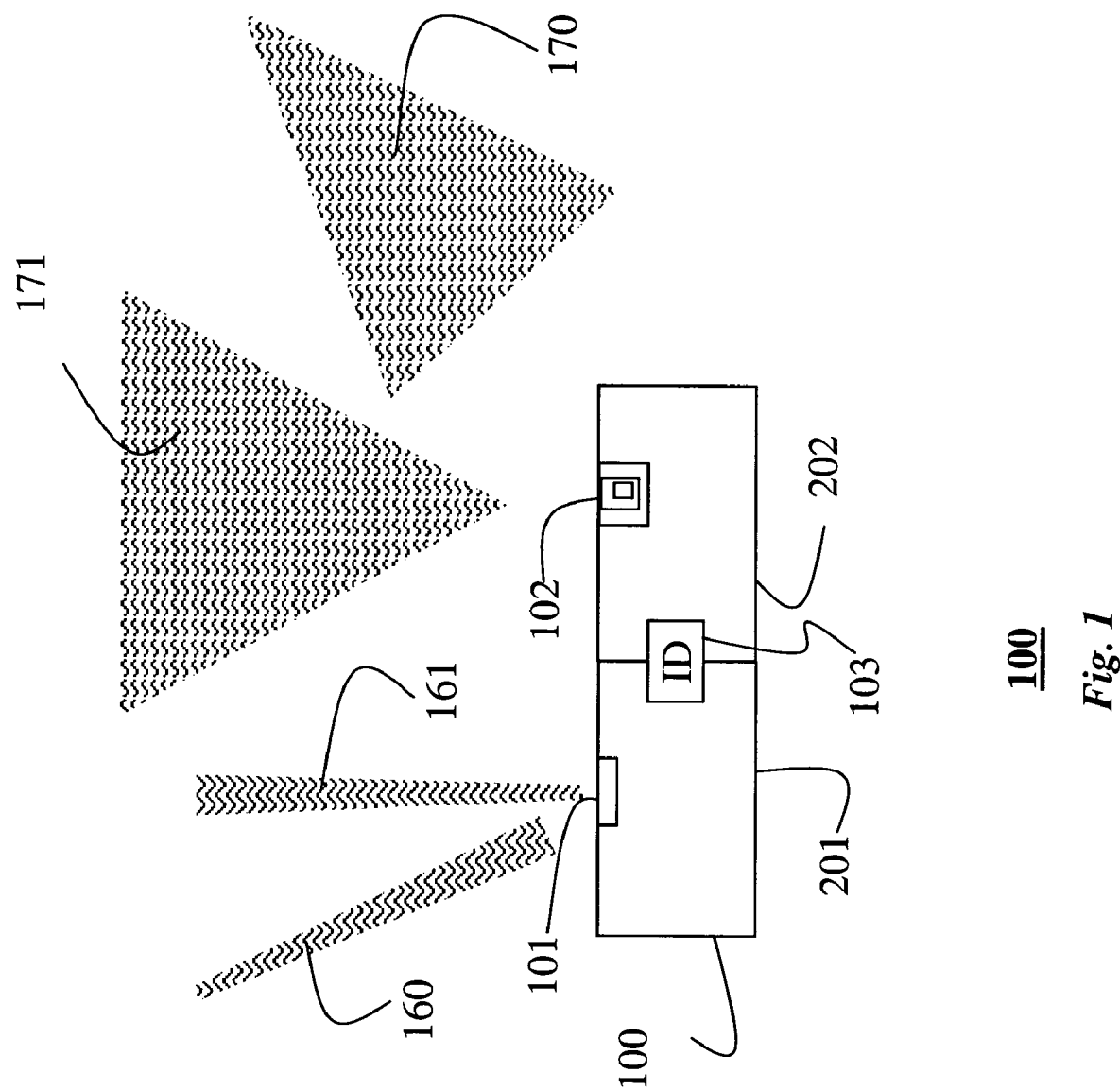
FIG. 1 is a block diagram of an identification tag 100 according to the invention.
Figure 2:
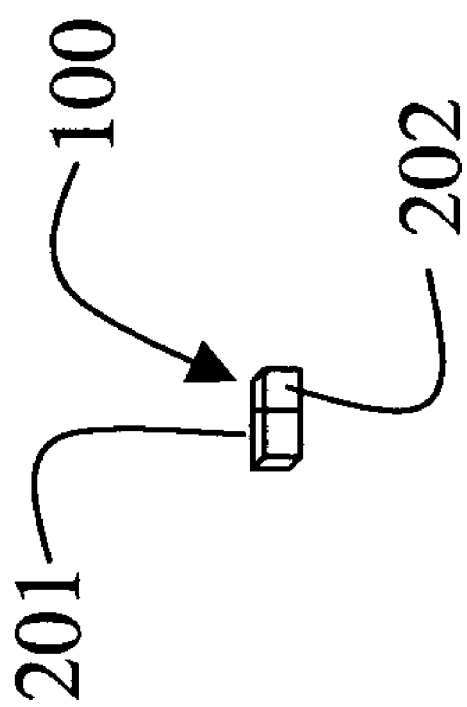
FIG. 2 is a top view of the tag of FIG. 1 to scale.

FIGS. 1 and 2 show an identification tag 100 according to the invention. The tag is formed on a single integrated microcircuit, e.g. a coupled of millimeters on each side. The tag is comparable to RFID tags as known in the art. The primary purpose of the tag is to provide identification to users. In addition, the tag according to the invention also provides for visual identification.

The tag 100 includes an optical-frequency (OF) transceiver 201 and a radio-frequency (RF) transceiver 202. The OF transceiver uses a single frequency band (optical channel) to receive and transmit signals. The RF transceiver uses another single frequency band (RF channel) to transmit and receive signals.

The OF transceiver 201 includes a photodiode or phototransistor 101 that is capable of receiving light 160 and transmitting light 161 in a specific frequency band. U.S. patent application Ser. No. 10/126,761 "Communication Using Bi-Directional LEDs," filed by Dietz et al. on Apr. 19, 2002, incorporated herein by reference in its entirety, describes such a photo transceiver. Alternatively, the OF transceiver can be a phototransistor. The OF transceiver can be used to acquire synchronization information to support communications with tag readers. The OF transceiver can be configured to be narrow beam or omni-directional.

The RF transceiver 202 includes an antenna 102 that can receive radio signals 170 and transmit radio signals 171. By 'transmitting,' it is meant that the RF antenna 102 can selectively couple to another antenna by a radio frequency signal. That is, the antenna is in the form of an induction coil. The current induced in the coil can also be used to power the OF and RF transceivers parasitically. The current can be stored in a capacitor Both transceivers 201–202 have access to a memory 103 storing an identification (ID) code. The code can include other information, such as a manufacturing date or an expiration date. The ID code can be unique, or belonging to a class of codes.

During operation, at least one of the transceivers operates in a receive mode, and at least one transceiver operates in a transmit mode. The receiving and transmitting transceivers can be the same or different. The 'receiving' transceiver, upon detecting a received signal on its associated channel, either the optical signal 160 or the RF signal 170, causes the 'transmitting' transceiver to respond with a transmitted signal, either the RF signal 171 or the optical signal 161. The transmitted signal is modulated according to the ID code 103, or some other stored information. It should be understood, the tag can also have both the transceivers operate in both modes concurrently. For example, if the ID code corresponds to a particular product class, and multiple products of that class are within range, only products with an expired date can respond.

Modes of Operation

Light-in/RF-out

A user shines a narrow beam of predetermined signal light 160 at the tag 100. The tag, in response to receiving the predetermined signal, transmits the ID in the RF signal 171 only if the predetermined signal 160 is received. This allows the user to select a specific tag for identification. For example, the user can identify a box at a hard to reach location. The RF transceiver is said to be transmitting when the RF antenna is selectively coupled to a sensing device to convey, e.g., the ID code 103.

RF-in/Light-out

A user transmits a query in the form of the predetermined radio signal 170 to an area including one or more tags. The tag then emits light 161 if the received signal matches the ID 103. This allows the user to visually identify a specific tag. This is useful to pick out a specific box mingled among other identical boxes. The light can be steady or modulated according to the code 103.

Light-in/Light and RF-out

A user shines a narrow beam of predetermined signal light 160 at the tag 100. The tag responds the ID in the RF signal 171 if the predetermined signal 160 is sensed. In addition, the tag transmits light 161 if the RF query signal matches the ID 103. This allows the user to select a specific tag for identification and to visually locate the tag.

RF-in/Light and RF-out

A user transmits a query in the form of the predetermined radio signal 170 to an area including one or more tags. The tag then emits light 161 if the query matches the ID 103. In addition, the tag emits light 161 if the query matches the ID 103. This allows the user to visually identify a specific tag, and obtain its identification.

Light-in and RF-in//Light and RF-out

In this case, the tag will respond with a light and an RF signal only if both a light and a RF signal are received.

The mode of operation can be predetermined, can be encoded in the tag, or can be selected dynamically by modulating the received signal appropriately.

The tag according to the invention solves the collision problem as described above. In addition, the tag allows for visual identification in application where a large number of tags are co-located.

It should be understood, that the tag can be enhanced to include means for storing power to increase the range of the transceivers. The transceivers can be operated parasitically from power obtained from the RF signal.

The tag can perform additional processing to store received data, and to operate in according with the stored data.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. An identification tag, comprising:
   a microcircuit, further comprising:
   an optical transceiver;
   a radio transceiver;
   a memory storing an identification code connected to the optical transceiver and the radio transceiver;
   means for operating at least one of the transceivers in receive mode while operating at least one of the transceivers in transmit mode; and
   means for transmitting the identification code by the transceiver operating in the transmit mode in response to receiving a predetermined signal by the transceiver operating in the receive mode.

2. The identification tag of claim 1 in which the optical transceiver includes a single photodiode configured to transmit and receive light signals.

3. The identification tag of claim 1 in which the radio transceiver includes an antenna formed as an induction coil.

4. The identification tag of claim 3, in which the induction coil acquires power for the optical transceiver.

5. The identification tag of claim 4, further comprising:
   means for storing the power.

6. The identification tag of claim 1, in which the identification code includes one or more dates.

7. The identification tag of claim 1, in which the received signal is a light signal, and the transmitted signal is a radio signal.

8. The identification tag of claim 1, in which the received signal is a radio signal.

9. The identification tag of claim 1 further comprising:
   means for operating at least one of the transceivers in receive mode and transmit mode while operating the other transceivers in transmit mode.

10. The identification tag of claim 1, further comprising:
    means for operating at least one of the transceivers in receive mode and transmit mode while operating the other transceivers in receive mode.

11. The identification tag of claim 1, further comprising:
    means for operating at least one of the transceivers in receive mode and transmit mode while operating the other transceivers in receive mode and transmit mode.

12. The identification tag of claim 1, further comprising:
    means for synchronizing the transmitting and receiving according to receiving light.

13. The identification tag of claim 1, in which the optical transceiver is omni-directional.

14. The identification tag of claim 1, in which the optical transceiver is narrow beam.

15. An identification method, comprising:
    storing an identification code in a memory connected to an optical transceiver and an radio transceiver;
    operating at least one of the transceivers in receive mode while operating at least one of the transceivers in transmit mode; and transmitting the identification code by the transceiver operating in the transmit mode in response to receiving a predetermined signal by the transceiver operating in the receive mode.

16. An identification tag comprising:
a microcircuit further comprising:
   a memory storing an identification code;
   an optical transceiver for receiving a predetermined optical signal; and
   a radio transceiver for transmitting the identification code stored in the memory when receiving the predetermined optical signal by the optical transceiver.

17. An identification tag of claim 16, wherein the optical transceiver transmits an optical signal, the radio transceiver receives a radio signal, further comprising:
   means for operating at least one of the transceivers in receive mode while operating at least one of the transceivers in transmit mode; and
   means for transmitting the identification code by the transceivers operating in the transmit mode in response to receiving a predetermined signal by the transceivers operating in the receive mode.

18. An identification method, comprising:
   receiving a predetermined optical signal at an optical communication transceiver in an identification tag; and
   transmitting an identification code stored in memory by a radio communication transceiver when receiving the predetermined optical signal by the optical communication transceiver.

19. An identification method of claim 18, further comprising:
   operating at least one of the communication transceivers in receive mode while operating at least one of the communication transceivers in transmit mode; and
   transmitting the identification code by the communication transceiver operating in the transmit mode in response to receiving a predetermined signal by the communication transceiver operating in the receive mode.

* * * * *